Figure 3:
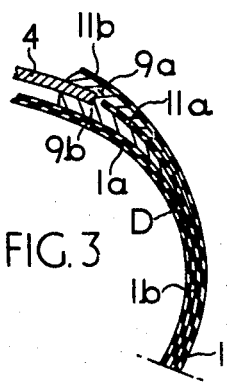

United States Patent

[11] 3,598,165

| [72] | Inventor | Jean Hanus<br>Montlucon, France |
|---|---|---|
| [21] | Appl. No. | 745,023 |
| [22] | Filed | July 15, 1968 |
| [45] | Patented | Aug. 10, 1971 |
| [73] | Assignee | The Dunlop Company Limited<br>London, England |
| [32] | Priority | July 31, 1967, Apr. 1, 1968 |
| [33] | | France |
| [31] | | 116287 and 146656 |

[54] PNEUMATIC TIRES WITH REINFORCED BREAKER ASSEMBLY
13 Claims, 7 Drawing Figs.

[52] U.S. Cl. .................................................. 152/361
[51] Int. Cl. .................................................. B60c 9/08
[50] Field of Search ...................................... 152/354, 355, 356, 359, 361, 357

[56] References Cited
UNITED STATES PATENTS

| 1,181,540 | 5/1916 | Peaslee | 152/361 |
| 2,786,507 | 3/1957 | Howe | 152/361 |
| 2,960,139 | 11/1960 | Engstrom | 152/354 |
| 3,050,098 | 8/1962 | Grote | 152/354 |
| 3,052,275 | 9/1962 | Hylbert | 152/354 |
| 3,085,616 | 4/1963 | Smith | 152/361 |

FOREIGN PATENTS

| 958,051 | 5/1964 | Great Britain | 152/361 |
| 973,944 | 11/1964 | Great Britain | 152/361 |

*Primary Examiner*—James B. Marbert
*Attorney*—Stevens, Davis, Miller & Mosher

ABSTRACT: A pneumatic tire comprising a carcass, a breaker assembly, and a reinforcement layer disposed in each shoulder region of the tire in directly overlapping relationship with said carcass and an edge of the breaker assembly such as to reduce the possibility of separation of the layers of the breaker assembly of which the following is a specification.

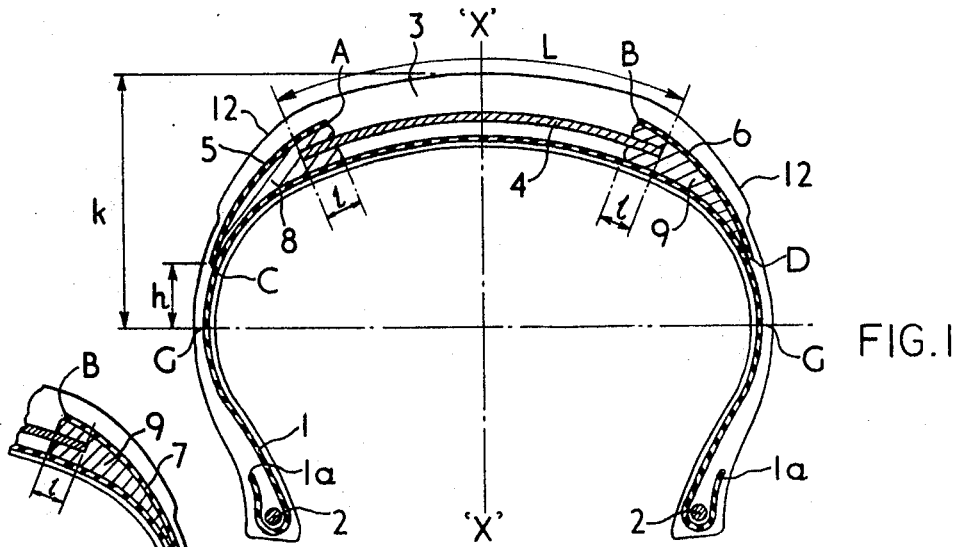
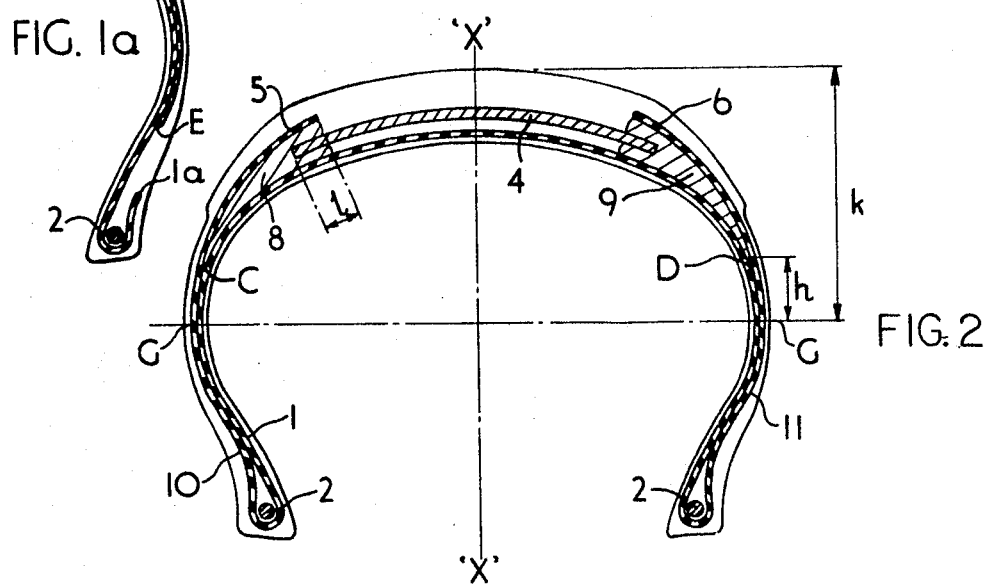

PNEUMATIC TIRES WITH REINFORCED BREAKER ASSEMBLY

The present invention relates to pneumatic tires, and more specifically to those pneumatic tires provided with a breaker assembly in the crown region thereof.

Pneumatic tires during use are subjected to forces which impose stresses on the various components of the tire. Thus, a pneumatic tire provided with a breaker assembly, particularly when cornering, is subject to stresses, generated by the carcass which tend to cause separation of the edges of the breaker assembly, and which may eventually cause tire failure. Said stresses may be caused by deformation of the rubber in the vicinity of the carcass and the edges of the breaker.

It is an object of the present invention to reduce or substantially eliminate said difficulties.

According to the present invention, there is provided a pneumatic tire comprising a carcass reinforcement, a breaker assembly disposed radially outwardly of said carcass reinforcement in the crown region of the tire, and at least on shoulder reinforcement layer of rubberized filamentary fabric, disposed on each side of the midcircumferential plane of the tire, substantially radially inwardly of each shoulder region of the tire, and arranged in directly overlapping relationship with, and disposed radially outwardly of, both a portion of the carcass reinforcement and an axially outer region of the breaker assembly.

Each said reinforcement layer of rubberized filamentary fabric, hereinafter termed "shoulder reinforcement layer," may be integral with a carcass reinforcement ply and may comprise a turn up portion thereof around a bead of the tire.

Alternatively each said shoulder reinforcement layer may not be integral with a carcass reinforcement ply and may comprise a layer of rayon, nylon, polyester, metal, or glass fiber filaments or cords.

In addition, the cords or filaments of said shoulder reinforcement layer may be radial (90° bias to the midcircumferential plane of the tire) or quasi-radial (substantially 90° bias with respect to said plane).

Alternatively, and more particularly, in the case where more than one of said shoulder reinforcement layers are employed, on the same side of the tire with respect to the midcircumferential plane thereof, the filaments or cords of successive layers may be inclined at equal and opposite angles with respect to the midcircumferential plane of the tire, and preferably, the inclination of the cords of each layer does not exceed 30° with respect to said plane.

Preferably the extent to which each said shoulder reinforcement layer overlaps an axially outer region of the breaker assembly is less than one-third of the width of the breaker assembly measured along the surface of the breaker assembly and axially thereof, and is preferably one-fifth of the width thereof.

Preferably at least one shoulder reinforcement layer diverges radially outwardly from the carcass to embrace therewith at the radially outermost end an axially outer edge of the breaker assembly.

In addition, if the neutral plane of the tire is defined as the cylindrical surface generated by rotation of an imaginary line joining the two axially opposed points, one on each tire sidewall, of maximum separation, then the distance from the neutral plane to the point at which the divergence of the reinforcement layer and the carcass commences is not greater than three-fourth of the radial distance between the said neutral plane and the peak of the crown portion of the tread measured from the said plane.

Preferably the distance of said point from the neutral plane measured radially outwardly thereof is greater than one-fifth of the distance of the peak of the crown of the tread from the neutral plane.

In addition, the distances over which each of the shoulder reinforcement layers closely directly overlap the carcass reinforcement on either side of the tire with respect to the said circumferential plane thereof may not be equal.

Preferably each annular zone substantially bounded by each said diverging shoulder reinforcement layer and its normal projection onto the carcass accommodates a rubber or rubberlike composition of hardness and modulus greater than or equal to that of the rubber or rubberlike material in regions adjacent said zone, for instance, the tire tread.

In addition, each said annular zone may comprise discrete layers of rubber or rubberlike composition of varying hardness the layers adjacent the carcass and the shoulder reinforcement preferably being of greatest hardness and modulus.

If the hardness of the rubber of the regions adjacent each said annular zone is of the order of 50° Shore, then preferably the hardness of said rubber or rubberlike composition accommodated by each annular zone lies between 50° and 90° Shore.

Figure 4:
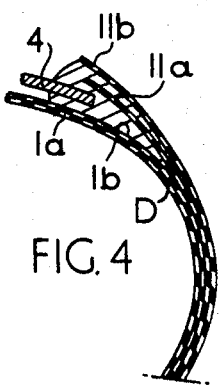
Figure 5:
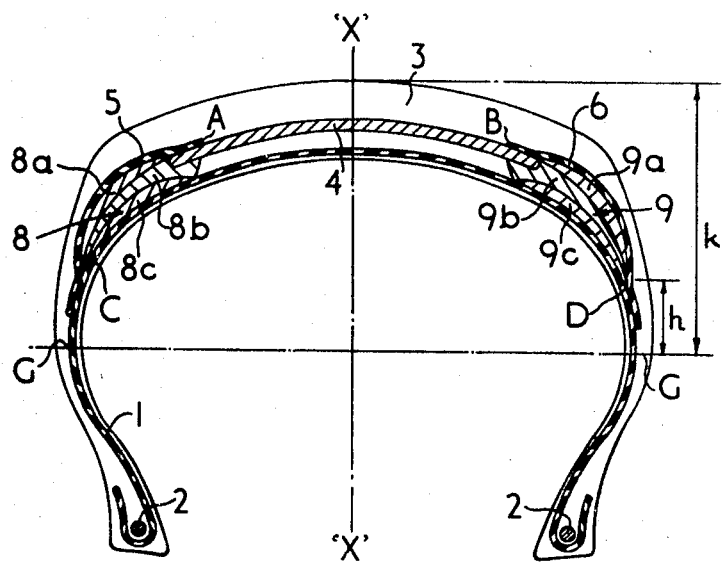

FIG. 1 shows a diagrammatic axial cross-sectional view through a pneumatic tire according to a first embodiment of the invention, FIG. 1A shows a diagrammatic axial fragmentary cross-sectional view through a pneumatic tire according to a modification of the first embodiment of the invention, FIG. 2 shows a diagrammatic axial cross-sectional view through a pneumatic tire according to a second embodiment of the invention, FIG. 3 shows a diagrammatic axial fragmentary cross-sectional view through a pneumatic tire according to a third embodiment of the invention, FIG. 4 shows a diagrammatic axial fragmentary cross-sectional view through a pneumatic tire according to a modification of the third embodiment of the invention, FIG. 5 shows a diagrammatic axial cross-sectional view through a pneumatic tire according to a fourth embodiment of the invention.

Figure 6:
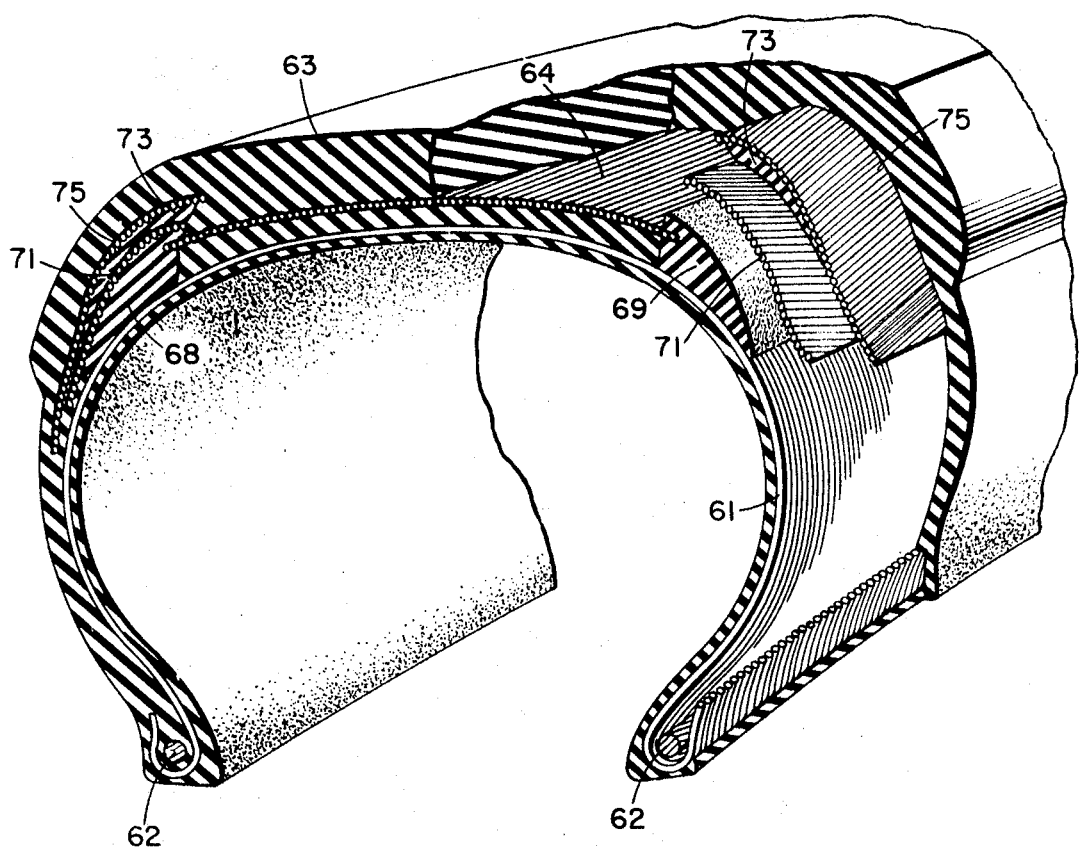

FIG. 6 shows a perspective view partly broken away of a tire having two shoulder reinforcement layers with the cords of successive layers being inclined at substantially equal and opposite angles.

According to a first embodiment of the invention illustrated in FIG. 1, a pneumatic tire comprises a radial ply carcass 1 (90° bias to the midcircumferential plane X–X of the tire), of single ply construction and a pair of beads 2, the ply of the said carcass 1 being anchored by the beads 2 so that each turnup portion 1a of the carcass ply is disposed axially outwardly of the carcass proper 1. The tire is also provided with a breaker assembly 4 disposed in the crown region of the tire and radially outwardly of the carcass 1. The breaker assembly 4 comprises a plurality of breaker layers of rubberized parallel cord fabric. In each shoulder region 12 radially outwardly of the carcass 1 and the breaker assembly 4 and in directly overlapping relationship therewith there is disposed a layer 5 or 6 comprising rubberized parallel cord material arranged at an angle of approximately 90° to the midcircumferential plane X–X of the tire. Each said shoulder reinforcement layer 5 or 6 lies in closely directly overlapping relationship with the carcass 1 at its radially inner end, the distance $l$ of each radially outermost point of close direct overlap C or D from the neutral plane G–G of the tire being approximately one-fifth of the distance $k$ of the crown 3 of the tire tread from said neutral plane G–G.

Each said shoulder reinforcement layer 5 or 6 diverges in a radially outward sense from the carcass 1 there being maximum separation at the radially outer end (A of the B) thereof, the latter said end thereof overlapping the breaker assembly 4, the extent of the overlap $l$ being substantially equal to one-fifth of the axial width $l$ of the breaker assembly measured along the curved surface of the breaker assembly.

Within each annular zone 8 or 9 defined by each diverging portion of each said shoulder reinforcement layer 5 or 6 respectively there is disposed a layer of rubber 8 or 9 of hardness substantially equal to 80° Shore, being of hardness at least equal to that of the rubber in the adjacent regions of the tire.

The construction is substantially symmetrical about the midcircumferential plane X–X of the tire.

In a modification, shown in FIG. 1A, of the first embodiment of the invention, a pneumatic tire substantially similar to that described in the first embodiment is provided. However, one shoulder reinforcement layer 7 disposed on one side of the tire is of greater length than the other layer (equivalent to reference 5 of FIG. 1) disposed on the other side of the tire with respect to the midcircumferential plane thereof. The disposition of the ends (A or B shown in FIG. 1) of each reinforcement layer (5 or 7) nearest the midcircumferential plane of the tire is substantially symmetrical about said plane. However, the length of close direct overlap of the layer 7 with the carcass reinforcement is substantially greater than that of the other layer 5, the radially inner extremity E of said layer 7 being radially inwardly of the neutral plane G–G of the tire.

According to a second embodiment of the invention, illustrated in FIG. 2, a pneumatic tire is provided substantially similar to that described in the first embodiment. However, according to the present embodiment, each shoulder reinforcement layer 5 or 6 is integral with the carcass reinforcement ply 1 and comprises the turnup portions thereof.

According to a third embodiment of the invention, illustrated in FIG. 3, a pneumatic tire is provided substantially similar to that described in the second embodiment of the invention. However, the carcass reinforcement 1 according to the present embodiment comprises two plies 1a and 1b, the radially inner ply 1a being of shorter length than the radially outer ply 1b. The turned up portions of the longer ply act in substantially the same capacity as those described in the second embodiment of the invention, each end 11b of the longer carcass reinforcement ply 1b being disposed radially outwardly of and in overlapping relationship with each axially outer portion of the breaker assembly 4. Each extremity 11a of each turnup portion of the shorter carcass reinforcement ply 1a however terminates short of the breaker assembly 4 and is disposed in substantially the same plane as that occupied by the breaker assembly 4.

In a modification, shown in FIG. 4, of the third embodiment, the said two carcass reinforcement plies 1a and 1b are of substantially the same length, so that the ends 11a and 11b of the turned up portions of both plies are disposed radially outwardly of the axially outer portions of breaker assembly and are in overlapping relationship therewith. The radially outer portions 11a and 11b of each turnup portion of each pair of plies 1a and 1b gradually diverge to effect a progressively greater separation up to their radially outermost limits.

In a fourth embodiment of the invention shown in FIG. 5, a pneumatic tire is provided, of construction substantially similar to that described in the first embodiment of the invention. However, in the present embodiment, each annular zone 8 or 9 bounded by each shoulder reinforcement layer 5 or 6 and its normal projection onto the carcass reinforcement 1 comprises three layers of rubber 8a, 8b, 8c or 9a, 9b, 9c respectively, each layer being disposed in the same general sense as that of the adjacentportion of the carcass reinforcement 1. The radially outermost layers 8a and 9a and radially innermost layers 8c and 9c comprise rubber of hardness approximately 80° Shore whereas the hardness of the intermediate layers 8b and 9b is approximately 70° Shore.

In addition each said shoulder reinforcement layer 5 or 6 is in closely directly overlapping relationship with each axially outer end of the breaker assembly.

FIG. 6 illustrates a further embodiment where two shoulder reinforcement layers 71 and 75 are separated by a layer of rubber 73. The carcass 61 is anchored by the beads 62 with a breaker assembly 64 directly under the crown 63 with the edges of the breaker 64 ending in a layer of rubber 68.

Having now described my invention—what I claim is:

1. A pneumatic tire comprising a carcass reinforcement, a breaker assembly disposed radially outwardly of said carcass reinforcement in the crown region of the tire and at least one shoulder reinforcement layer of rubberized filamentary fabric disposed on each side of the midcircumferential plane of the tire, substantially radially inwardly of each shoulder region of the tire, said reinforcement layers being disposed radially outwardly of both a portion of the carcass reinforcement and an axially outer region of the breaker assembly and being arranged in overlapping relationship with the radially outermost surface of said axially outer region of the breaker assembly and in directly overlapping relationship with said portion of the carcass reinforcement each annular zone substantially bounded by each diverging shoulder reinforcement layer and its normal projection onto the carcass accommodating a rubber or rubberlike composition of a hardness and modulus greater than that of the rubber or rubberlike material in regions adjacent said zone.

2. A pneumatic tire according to claim 1 wherein each said shoulder reinforcement layer is integral with a carcass reinforcement ply, and comprises the turnup portion thereof.

3. A pneumatic tire according to claim 1 wherein each shoulder reinforcement layer is a separate component from the carcass ply and comprises a layer of rubberized parallel nylon, rayon, polyester, metal or glass fiber filament or cords.

4. A pneumatic tire according to claim 1 wherein the cords of the carcass reinforcement and the cords or filaments of each shoulder reinforcement layer are parallel and are inclined substantially at 90° to the midcircumferential plane of the tire.

5. A pneumatic tire according to claim 3 wherein the carcass reinforcement cords are disposed substantially at 90° to the midcircumferential plane of the tire and at least two shoulder reinforcement layers are provided in each shoulder of the tire, the cords of successive layers being inclined at substantially equal and opposite angles lying between 0° and 30° with respect to a circumferential plane of the tire.

6. A pneumatic tire according to claim 1 wherein the extent to which each shoulder reinforcement layer overlaps the axially outer region of the breaker assembly is substantially less than one-third of the axial width of the breaker assembly measured along the curved surface of the breaker assembly.

7. A pneumatic tire according to claim 6 wherein the extent of said overlap is substantially equal to one-fifth of the axial width of the breaker assembly measured along the curved surface of the breaker assembly.

8. A pneumatic tire according to claim 1 wherein at least one shoulder reinforcement layer diverges radially outwardly from the carcass to embrace therewith at the radially outermost end an axially outer edge of the breaker assembly.

9. A pneumatic tire according to claim 8 wherein the point at which the divergence of the reinforcement layer and the carcass commences is not greater than three-fourths of the radial distance between the neutral plane of the tire and the peak of the crown portion of the tread measured from the said plane.

10. A pneumatic tire according to claim 9 wherein the distance of said point at which the divergence of the said reinforced layer and the carcass commences from the neutral plane of the tire is not less than one-fifth of the distance of the peak of the crown portion of the tread from the said plane.

11. A pneumatic tire according to claim 8 wherein the lengths over which each of the shoulder reinforcement layers on each side of the tire directly overlap the carcass reinforcement are not equal.

12. A pneumatic tire according to claim 1 wherein said annular zone accommodates at least two layers of rubber or rubberlike composition is least two layers of which are of different hardness or modulus.

13. A pneumatic tire according to claim 12 wherein the layers of rubber or rubberlike material adjacent the carcass reinforcement and shoulder reinforcement are of a composition of greater hardness and modulus than any intermediate layer or layers.